United States Patent [19]

Mimmack et al.

[11] Patent Number: 5,052,800
[45] Date of Patent: Oct. 1, 1991

[54] BORESIGHTING METHOD AND APPARATUS

[75] Inventors: William E. Mimmack, El Paso, Tex.;
William J. Thompson, El Cajon, Calif.

[73] Assignee: Cubic Corporation, San Diego, Calif.

[21] Appl. No.: 518,998

[22] Filed: May 4, 1990

[51] Int. Cl.⁵ .............................................. G01C 1/00
[52] U.S. Cl. ................................... 356/152; 356/400; 33/281
[58] Field of Search ............... 356/141, 152, 153, 399, 356/400; 33/281

[56] References Cited

U.S. PATENT DOCUMENTS

| | | | |
|---|---|---|---|
| 3,816,000 | 6/1974 | Fiedler | 356/400 X |
| 3,865,483 | 2/1975 | Wojcik | 356/152 X |
| 4,105,339 | 8/1978 | Wirtanen | 356/152 |
| 4,776,691 | 10/1988 | Johnson et al. | 356/152 |

*Primary Examiner*—Linda J. Wallace
*Attorney, Agent, or Firm*—Edward K. Kaprelian

[57] ABSTRACT

In a weapon boresighting system for aircraft and other vehicles a pair of spaced apart, collimated laser beams oriented to a fixed reference line on the vehicle are transmitted to a receiver positioned at the weapon or other module to be boresighted, the receiver having a first section including a position sensitive cell for measuring pitch and yaw relative to a pitch and yaw reference surface and a second section including a position sensitive cell for measuring roll relative to a roll reference surface.

23 Claims, 7 Drawing Sheets

BORESIGHTING METHOD AND APPARATUS

BACKGROUND OF THE INVENTION

1. Field of the Invention

This invention, which is an extension of the method and apparatus disclosed in application Ser. No. 07/497,543, now U.S. Pat. No. 5,005,973, filed Mar. 20, 1990 in the name of the present inventors relates to a method and apparatus for boresighting such aimable units or components as weapons systems and avionics equipment aboard fixed-wing and rotary-wing aircraft as well as tanks and other vehicles to thereby insure that a weapon's delivery point coincides with its aimpoint. Through the use of optical metrology, the various components are boresighted to maintain alignment relative to the aircraft boresight reference line. Specifically, this optical metrology system accomplishes boresighting through the transfer of a fixed reference line in yaw, pitch, and roll from a measurement reference line on aircraft or other vehicle to various points including sighting stations, sensors and weapon stations. For example, it is necessary that various modules on both rotary and fixed-wing aircraft maintain correct positions within 30 arc seconds or less. Through use of the boresighting system of the present invention, departures from the prescribed position can be measured and corresponding corrections effected.

Typical modules include a heading and attitude reference system, gun, stabilized sight unit, night vision unit, doppler radar, air data sensor, missiles, head-up display, forward looking infrared and laser spot tracker.

2. Prior Art

Alignment devices have been employed in the past to verify boresight alignment and to measure boresight error between a reference line of sight and the sighting means of the vehicle and a weapon on military aircraft and other vehicles.

One such system is that of U.S. Pat. No. 4,762,411 which shows a boresight alignment verification device comprising a portable cart spaced apart from the aircraft which carries the sights and weapons to be boresighted and employing a collimated light source and an extendible periscope which directs light to an optical reference fixture mounted at a line of sight on the aircraft. The reflected light is matched on a matrix camera against a beamsplit portion of the projected light. This arrangement has the disadvantage of relative movement occurring between the spaced-apart verification means during the frequently lengthy calibration period and corresponding repositioning, in contrast to applicant's system in which the verification means is attached to the aircraft and is not relatively movable thereto.

U.S. Pat. No. 4,191,471 shows an aircraft armament alignment arrangement employing a jig which is temporarily fastened to the aircraft. A collimated, incoherent light source is attached to the aircraft at a reference surface which defines an aircraft datum line. A collimator fastened to the jig carries a translucent screen with grid markings on which the image of the light source is visible. The jig is moved relative to the aircraft until the image is centered and is there fixed. Thus, the jig becomes an intermediate element for carrying directionality and alignment information to a weapon bore and to a sight. The collimated light source is next attached to produce a beam parallel to the bore of a gun pod and the gun pod adjusted so as to center its light beam on the screen of the repositioned collimator. The collimated light source is then moved to a socket on the jig and its light beam directed to an optical sight. The latter is then adjusted until its line of sight is parallel to the axis of the collimated light source. Factors detracting from the potential accuracy of this system are errors resulting from the use of an intermediate element and the repositioning of the light source and the collimator.

U.S. Pat. No. 4,769,539 shows an arrangement for the measurement of the relative roll angle between a two-beam sending unit and a bi-cell receiver. The two light beams passing through apertured masks are differently modulated, and when received on the bi-cell the resultant currents are separated electrically and the roll angle computed from the ratios of these separated components. The light beams fill their corresponding masks, and the light passing through the masks is imaged by a lens onto the bi-cell. U.S. Pat. No. 4,769,539 will operate at one separation only between sending point and receiving point without refocusing of the sending unit optical system. The smallest measurable change in roll angle (the noise equivalent roll angle increment) depends on the size of the masks on the bi-cell; smaller images give superior resolution. The range of roll angle measurable, and especially the linear range, also depends on the size of the images of the masks on the bi-cell; larger images give superior roll angle measurement linear range. A difficult trade-off between resolution and linear range of measurement may need to be made in applying the teaching of U.S. Pat. No. 4,769,539. The sensitivity of roll measurement also depends on the distance separating the mask images on the bi-cell. This separation, along with the sizes of the mask images, reflect the result of making the required trade-off to achieve the resolution and range of any particular application. The movement of the images in yaw, for example, depend on the yaw angle of the sending unit and the distance between sending unit and receiving unit. This yaw error must be very small compared with the roll measurement range or the mask images will move completely off the bi-cell dividing line.

SUMMARY OF THE INVENTION

An object of this invention is to provide a means for rapidly and accurately boresighting a number of modules on an aircraft in yaw, pitch and roll through employment of optical metrology principles.

This is accomplished, in its simplest form, through use of a pair of laser beams, one position sensitive cell for pitch and yaw measurement and either one or a pair of cells receiving light from said laser and one or more light deviating means positioned between the laser and the sensors.

The apparatus consists of an optical cube, a transmitter or projector, a deviator section, and a sensor or receiver. The transmitter emits a pair of spaced-apart, angularly divergent collimated beams of laser light the average direction of said beams being perpendicular to a mirrored face of the cube. The deviator is a form of periscope or retroreflector using mirrors or prisms for altering the direction or position of light while insuring that the displaced beam remains parallel to the incident beam The sensor measures any difference in direction between an incoming beam (from the cube and the projector and via the deviator) and the optical axis of the sensor. The transmitter is a retroflective catadioptric collimator shown here as a doublet, carrying on its axis a spaced-apart pair of single mode optical fibers which terminates at the nodal point of the lens. Each fiber directs light to the mirrored face of an optical cube, spaced a distance equal to one half the focal length of the lens, which light is then redirected to the lens and projected outward. The fiber receives light from a solid state laser which may have any convenient wavelength; for the present invention a wavelength of 670 nm is preferred.

The receiver comprises an objective lens, a beam splitter for reflecting light to a first position sensitive detector or sensor for measuring pitch and yaw, a telenegative lens for increasing the focal length of the objective, a tilt plate and either one or two position sensitive detectors or sensors for measuring roll.

The optical deviator may be of the zero deviation (rhomboid) or the 180 degree deviation type. In the former the reflectors are spaced-apart flat mirrors with their reflecting surfaces parallel. In the 180 degree deviator one flat mirror and one roof reflector or roof prism are used. Deviators may be combined, or articulated, to provide a variable length between the point of light input and the point of light output. These cascaded or articulated deviators may be of either the zero deviator or 180 degree deviation type.

In use, the output of a transmitter is focused of the sensor in the receiver, with or without intervening deviators. Departure from an aligned condition results in an analog, digital or video representation which indicates the degree and direction of such departure.

DESCRIPTION OF THE PREFERRED EMBODIMENTS

Figure 1:
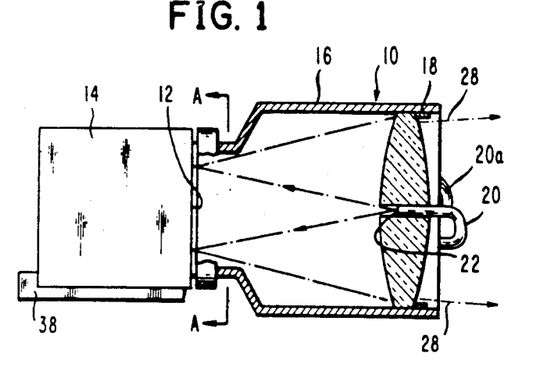
FIG. 1 shows, in cross-sectional view, an optical cube and transmitter for producing two collimated beams of laser light.
Figure 2:
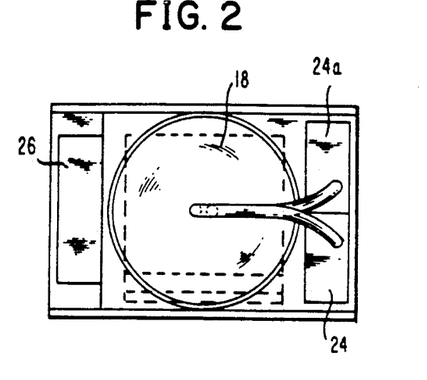
FIG. 2 shows the transmitter of FIG. 1 in front elevational view.

FIG. 1 shows in vertical cross section a typical transmitter 10 which cooperates with the mirrored face 12 of an optical cube 14. Transmitter 10 consists of a body 16 which carries within a cylindrical opening at one end a collimating lens 18, shown here as a doublet, which is provided with a pair of closely spaced angularly divergent holes the average direction of said holes being coincidental with the optical axis of the lens. Into the holes is cemented or otherwise attached a pair of single mode optical fibers shown at 20 and 20a which diverge in accordance with that of their respective holes and one end of each of which terminates in the plane of the second nodal point 22 of the lens. The other end of each of the fibers 20 and 20a receives light from laser diodes 24 and 24a respectively located in a cavity in the body as shown in FIG. 2. Alternately, a single pigtailed laser diode with a 1×2 coupler illuminating two single mode optical fibers could be employed in place of the two laser diodes 24 and 24a. Electronics 26 for the laser are housed in a second cavity in the body. In those cases where the highly accurate collimation provided by a single mode fiber illuminated by a laser is not needed (as with less extreme distances) a multi-mode communications fiber (core diameter on the order of 50 micrometers) illuminated with a noncoherent source (a light emitting diode for example) can be used.

As best seen in FIG. 1, light emitted from the ends of the fiber is reflected by mirrored surface 12 of cube 14 back to lens 18 from which it projects as beams of collimated light 28.

Location of the ends of the fibers at an equal distance laterally from the nodal point of an unconventional retroreflective catadioptric collimator insures that the direction (or bearing) midway between the two projected beams remains perpendicular to the mirrored surface 12 despite any tilting of the transmitter. Embedding the light source for the collimator, i.e. the fibers, in the lens insures that the direction of the collimated light of both beams is not influenced by any movement of the transmitter whatsoever. An accurately ground flange 38 provides a mounting surface to provide a match of the surfaces of the optical cube to the aircraft boresight reference line.

Figure 3:
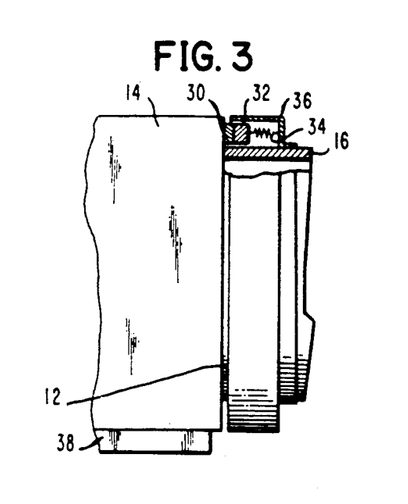
FIG. 3 shows, in detail the means for attaching the transmitter to the cube.
Figure 4:
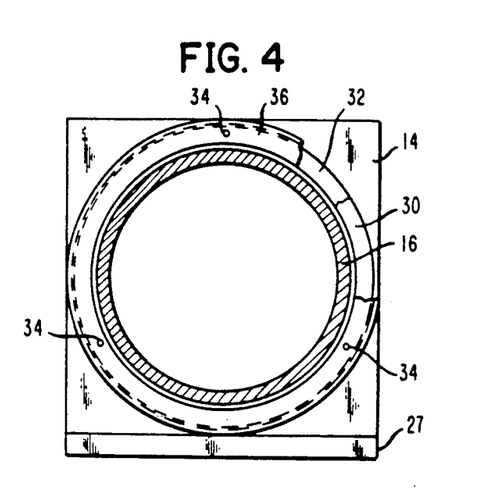
FIG. 4 shows the transmitter attached to the cube.

FIG. 3 and 4 show along view A-A of FIG. 1 and on an enlarged scale, one arrangement for attaching transmitter 10 to the optical cube. A flat steel washer 30 is cemented to a mirrored face of cube 10 and acts as one surface of a magnetic catch. An annular magnet 32 acting as the second face of the magnetic catch is carried on several extension springs 34 carried within an annular cover 36 fastened to body 16. When that end of body 16 is held against the cube, magnet 34 fastens itself to washer 30, and with the aid of springs 34 forces the end of body 16 into contact with the cube. Other arrangements using hooks, straps or clamps may be used as preferred.

Figure 5:
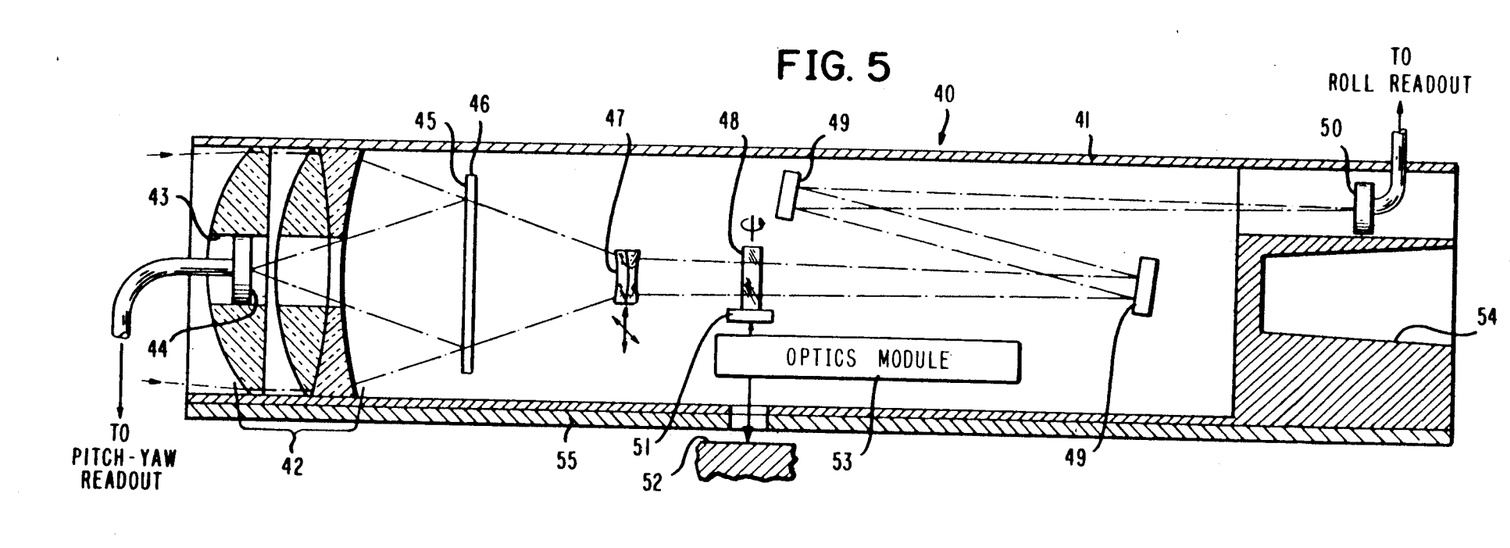
FIG. 5 shows, in partial cross-sectional view, a receiver module for receiving light from a transmitter.
Figure 6:
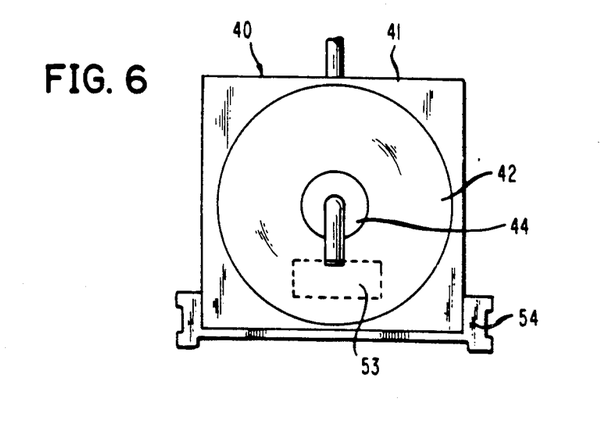
FIG. 6 shows a front view of the receiver of FIG. 5.

FIGS. 5 and 6 show in side sectional and front elevational views, respectively, a receiving sensor for accepting the collimated from the two optical fibers 20 and 20a in the transmitter 10 of FIGS. 1 to 4. The sensor housing, or receiver, 40, comprises a body member 41 which carries at one end an objective 42 which receives collimated light from transmitter 10. Objective 42 is of large relative aperture with good correction for aberrations, and may have three, four or more elements. Objective 42 is provided with an axial hole 43 in which is fitted, coaxial with the objective axis a lateral effect cell 44, the active surface of which is located at the nodal point of the objective.

Positioned at a distance one-half the focal length of objective 42 is the reflecting surface 45 of a beam splitter 46 which directs approximately 10 to 20 percent of the light from the objective on lateral effect cell 44, which, as is to be described, measures pitch and yaw. Light passing through beam splitter 46 is received by telenegative lens 47 which sharply reduces the convergence of the light rays and thus increases the focal length of the objective-telenegative combination by a factor of ten or more.

The light next passes through a rotatable tilt plate 48 and is received, via beam folding mirrors 49, by lateral effect cell 50 which measures roll. Attached to tilt plate 48 is a mirror the reflecting surface 51 of which is adjusted to have its normal parallel to the axis of rotation of the tilt plate. A reflecting roll reference surface 52 is part of the aircraft fixture. A module 53, to be described, views surfaces 51 and 52 and measures their angular difference. A precision tapered hole 54 may be provided for attachment to certain alignment fixtures. A flange member 55 is accurately ground to provide additional mounting surfaces as required to match those of the fixed reference line of the aircraft.

Alternately, body member 41 may be a centerless ground cylinder intended for use with a vee-block. The roll position sensor may be a lateral effect cell, a quad cell, a charge coupled camera (CCD) or similar device as will be described below. Location of the pitch and yaw sensor at the nodal point of the lens insures the integrity of its optical axis in a manner similar to that of the fiber and lens arrangement of the transmitter.

Figure 7:
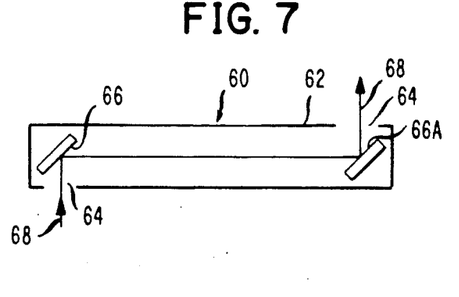
FIG. 7 shows, in partial cross-section, one type of deviator for delivering light from a projector to a sensor.

FIG. 7 shows, diagrammatically, a zero degree, or rhomboid, deviator 60 comprising a body 62 provided with entrance and exit windows 64 and 64A respectively and parallel flat reflectors 66 and 66A. The light path is delineated at 68.

Figure 8:
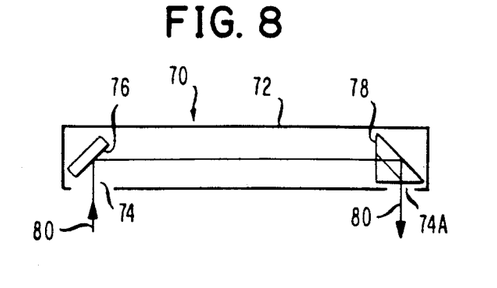
FIG. 8 shows, in partial cross section another type of deviator.

FIG. 8 shows, diagrammatically, a 180 degree deviator 70 comprising body 72, entrance and exit windows 74 and 74a respectively, a plane reflector 76 and a roof prism 78. The light path is shown at 80.

Figure 9:
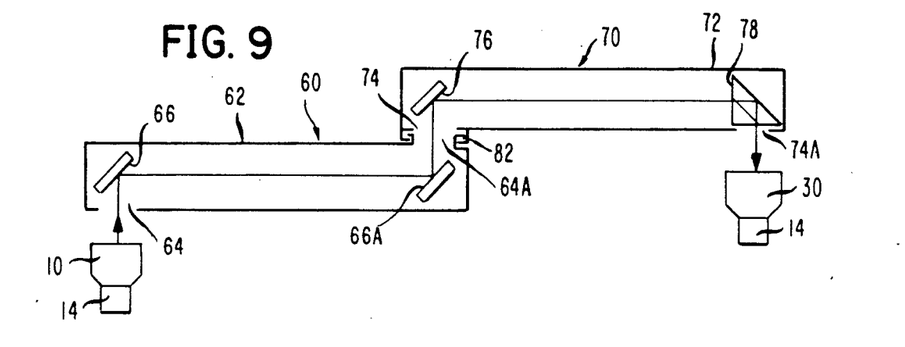
FIG. 9 shows a typical arrangement employing a projector, a sensor and two deviators.

A relatively simple boresighting arrangement using one zero degree deviator 60 and one 180 degree deviator 70 is shown in FIG. 9. Here, collimated light from projector 10 passes through window 64 of deviator 60, is reflected by mirrors 66 and 66A and exits through window 64A into window 74 of the 180 degree deviator 70, is reflected by mirror 76 and prism 78 and passes out of window 74A to a receiver 40. In the example shown here deviators 60 and 70 are joined at a hinge 82. If the images received at the position sensitive detector are not imaged at the latter's center, an electrical signal results indicating the direction and degree of departure from those centers.

Figure 10:
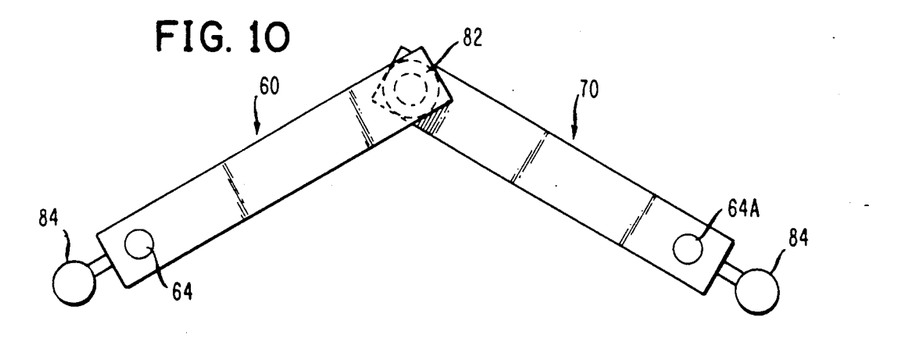
FIG. 10 shows a pair of deviators coupled together to form an articulated variable length structure.

FIG. 10 is a schematic showing of a pair of deviators similar to those of FIG. 7 in which the two deviators are swiveled at hinge joint 82 to have an angular relationship other than 180 degrees and to thereby allow flexibility in the extension distance. The deviators are provided with counterweights 84 to aid in holding their positions. Because of the high accuracy in mirror and prism position as well as that of the hinge construction, the integrity of a beam of collimated light from a projector entering window 64 is not lost or altered when it exits window 64A.

Figure 11:
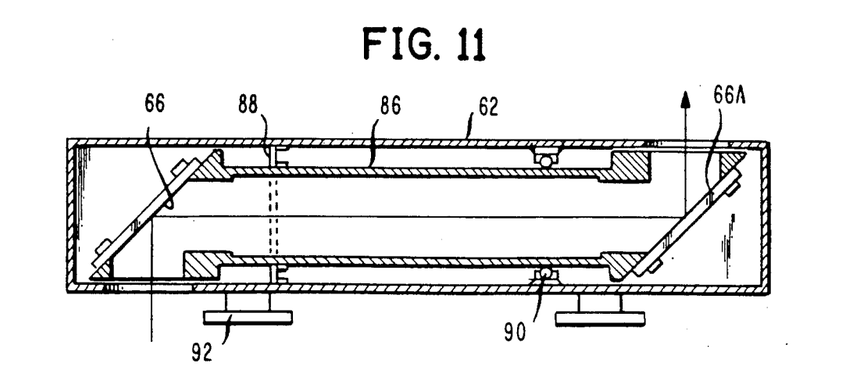
FIG. 11 shows the detailed structure of a zero degree deviator.

A somewhat more detailed showing of the zero degree deviator is shown in FIG. 11. Here, reflectors 66 and 66A are mounted at the ends of a rigid tube 86. Tube 86 is mounted at one end by means of a metal diaphragm 88 to outer body 62. At the other end it is supported by body 62 through a bearing 90. Diaphragm 88 and bearing 90 isolate the mirrors and their interrelationship from the effects of flexing of body 52, thereby insuring that the deviated beam is parallel to the incident beam. Suitable means such as feet 92 may be provided for supporting the deviator body on a convenient structure on the aircraft. When used to perform the full boresighting task on an aircraft, the system of the present invention uses the projector of FIG. 1 to 4 attached to a primary reference cube 14. The latter is itself previously accurately positioned with respect to the aircraft's boresight reference line and there held on an appropriate fixture. The receiver is positioned on a boresighting tool attached to the particular weapon or instrument being boresighted.

Figure 12:
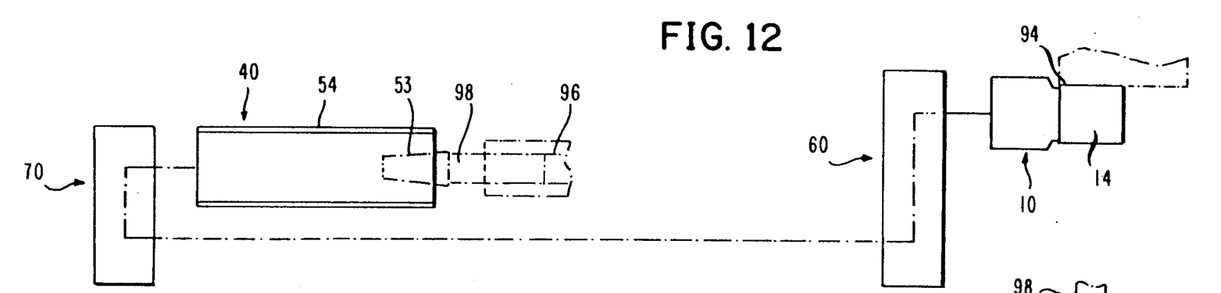
FIG. 12 shows one arrangement for performing a full boresighting task.
Figure 13:
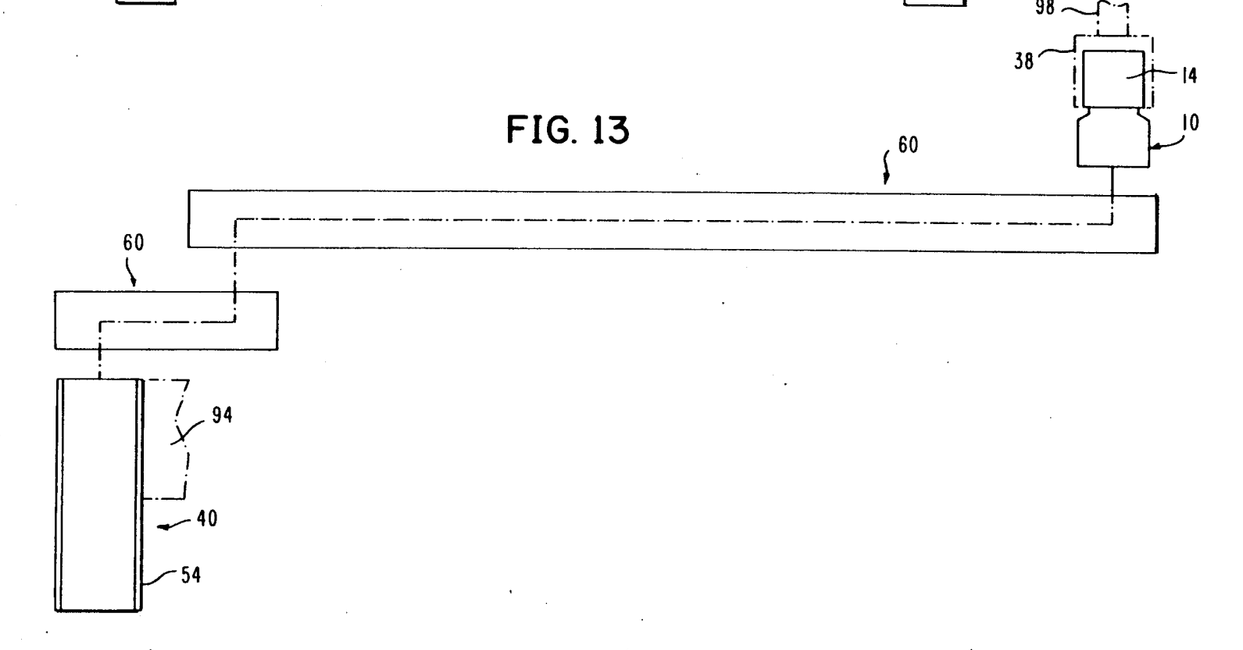
FIG. 13 shows another arrangement for performing a full boresighting task.

FIGS. 12 and 13 show two such arrangements. In FIG. 12 the optical cube to which projector 10 is fastened is positioned against the fixed reference line 94 which establishes that the collimated beam from projector 10 is parallel to the longitudinal axis of the aircraft or other vehicle. A zero degree deviator 60 moves the beam from its initial position to a new position parallel to the initial position. If the light path to the next deviator is one of straight line-of-sight, no intermediate optics are needed and the collimated beam enters 180 degree deviator 70 and into receiver 40 which in this example is inserted into the barrel 96 of a gun via one end of an adapter 98, the other end of which is tapered and enters the tapered opening 54 of the receiver.

Whereas in FIG. 12 the lenses of the projector and receiver pointed in the same direction, this arrangement also reverses the locations of the projector and receiver. Here, receiver 40 is located at fixed reference line 94 and receives collimated light from projector 10 via zero degree deviators 60. Projector 10 via flange 38 and adapter 98 connects to the boresighting fixture of the particular weapon, sight or other device being calibrated.

In normal operation of the system, the collimated laser light from the projector of FIGS. 1 to 4, located at a reference line of sight, is directed via one or more deviators such as those of FIGS. 7 to 13, to objective 42 of receiver 40. Light leaving lens 42 converges toward beam splitter 46. Semi-reflecting surface 45 of the beam splitter is very accurately positioned to be normal to the reference line of the aircraft element (weapon, sensor, designator, etc.) being boresighted and thus acts as reference surface for pitch and yaw measurement. It is located a distance one half the lens focal length from lateral effect cell 44. Thus, incoming collimated light is focused on the cell, which, by virtue of this geometry, is at the nodal point of lens 42. As in the case of the projector, lens 42 and mirror surface 45 comprise a retroreflective catadioptric collimator employed here in reverse. The light passing through the beam splitter 46 then encounters telenegative lens 47. This lens drastically reduces the convergence of the beam to yield an objective/telenegative combination having a focal length which may be as long as 2000 mm in some circumstances. A long focal length is needed in order that the images formed by the pair of laser beams from the transmitter should be sufficiently separated from each other in the focal plane that roll measurements (angular) of the required accuracy can be obtained from a difference between positional measurements of the two images. The telenegative lens is made to be movable in x and y directions to serve another function. The long focal length needed for accurate roll measurement has rendered the system very sensitive to pitch and yaw errors. Relatively small pitch or yaw errors will produce large displacements of both of the images in the focal plane. For reasons related to position measuring resolution the lateral effect cell used should be small, so large movements of the images caused by pitch and yaw errors will not be tolerable. The magnitudes of pitch error and yaw error present are known from the outputs derived from cell 44. This information is used to position telenegative lens 47 by means of servo motors, not shown, so as to bring the two images into a correct relationship with respect to the lateral effect cell used for roll measurement. Light from the telenegative lens is displaced by the tilt plate 48 to permit movement of the two images onto the same region of the lateral effect cell. Two separate lateral effect cells might be used, one for each image, but the linearity and thermal null drift of devices currently available might be so large as to reduce the obtainable accuracy with two cells to unacceptable levels in some cases. If the two images are brought to essentially similar regions of the same cell the null drift effects are eliminated and non-linerality effects drastically reduced. Tilt plate 48, with an associated drive system, not shown, serves to position one image on lateral effect cell 50 for measurement and then a short time later the second image. A solenoid or similar actuator rotates the tilt plate to move first one and then the other of the two light spots onto lateral effect cell 50. The light spots may be spaced apart approximately 10 mm or more if 0.1 milliradian roll measurement accuracy is desired. If the axis about which the tilt plate rotates were exactly perpendicular to the plane defined by the chief rays of the pair of light beams (which is the roll measurement reference plane) then the two images would be brought to exactly the same y position on the lateral effect cell. The measured position difference, and the calculated roll error, would be zero. If a roll error exists then the axis about which the tilt plate rotates will not be perpendicular to the plane defined by the pair of light beams, and the images will fall at different y positions on the lateral effect cell. Consequently a position difference will be measured and a roll error calculated. Light passing through the tilt plate strikes mirrors 49, which permit folding of the optical path to yield a relatively short receiver length, and then goes on to lateral effect cell 50 in the focal plane. In order to insure integrity of the system it is necessary that the relationship between the axis of the tilt plate and the body whose roll is being measured be known. To this end a module 53 shown in FIGS. 16 and 17 compares in one coordinate the angle between a mirror 51 attached to the tilt plate, whose surface is perpendicular to that of the tilt plate axis of rotation, and a mirror 52 attached to the fixture connected to the body whose roll error is being measured.

Figure 14:
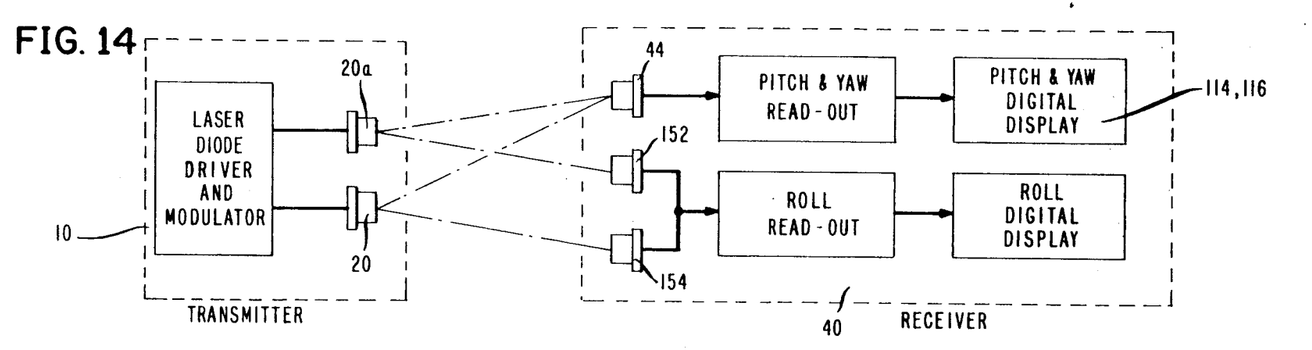
FIG. 14 shows a block diagram of one readout arrangement for receiver 40.
Figure 15:
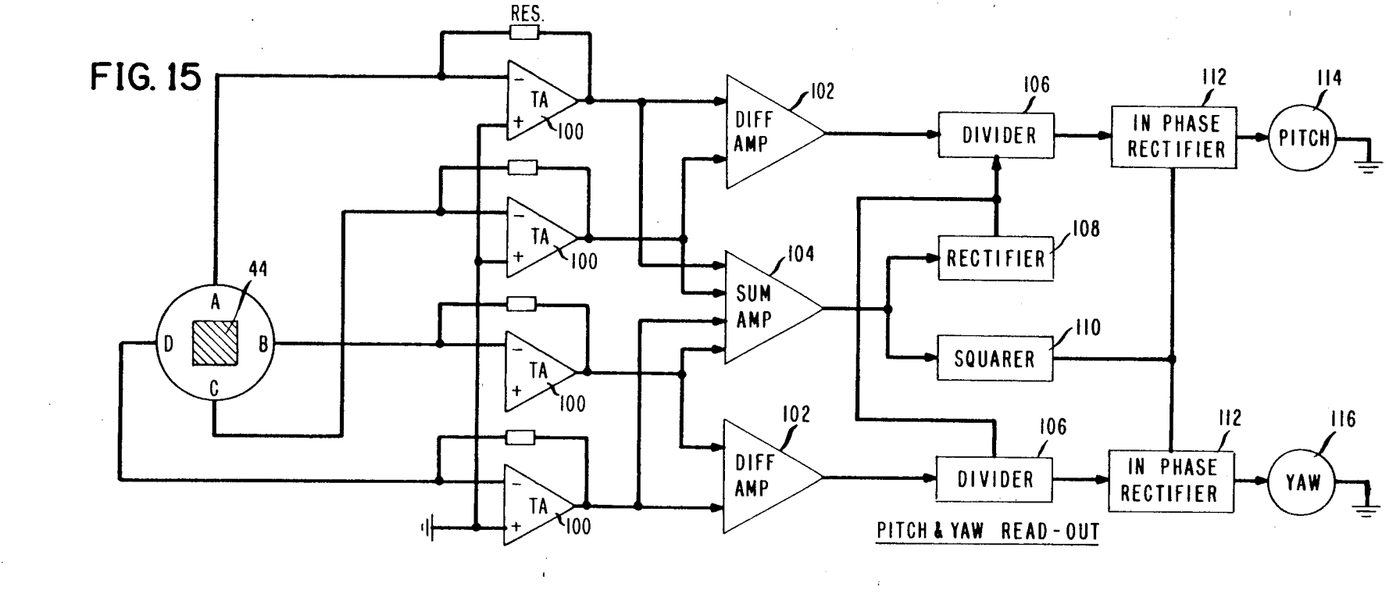
FIG. 15 shows diagrammatically the preferred circuitry for pitch and yaw measurement.

The electronics for the measurement of pitch and yaw in the receiver 40 of FIGS. 5 and 6 is shown in FIGS. 14 and 15. FIG. 14 shows the overall arrangement for the transmitter and for the receiver, the latter depicting a roll read out utilizing a pair of lateral effect cells 124 and 126.

As shown in FIG. 15 the output of lateral effect cell 44 is received by transimpedance amplifiers 100 and then to differential amplifiers 102 and sum amplifier 104. After processing by dividers 106, rectifier 108 and squarer 110, inphase rectifiers 112 yield the pitch and yaw signals for displays 114 and 116. The pitch and yaw read-out of FIG. 15 is shown diagrammatically in the upper portion of receiver 40 in FIG. 14.

Figure 16:
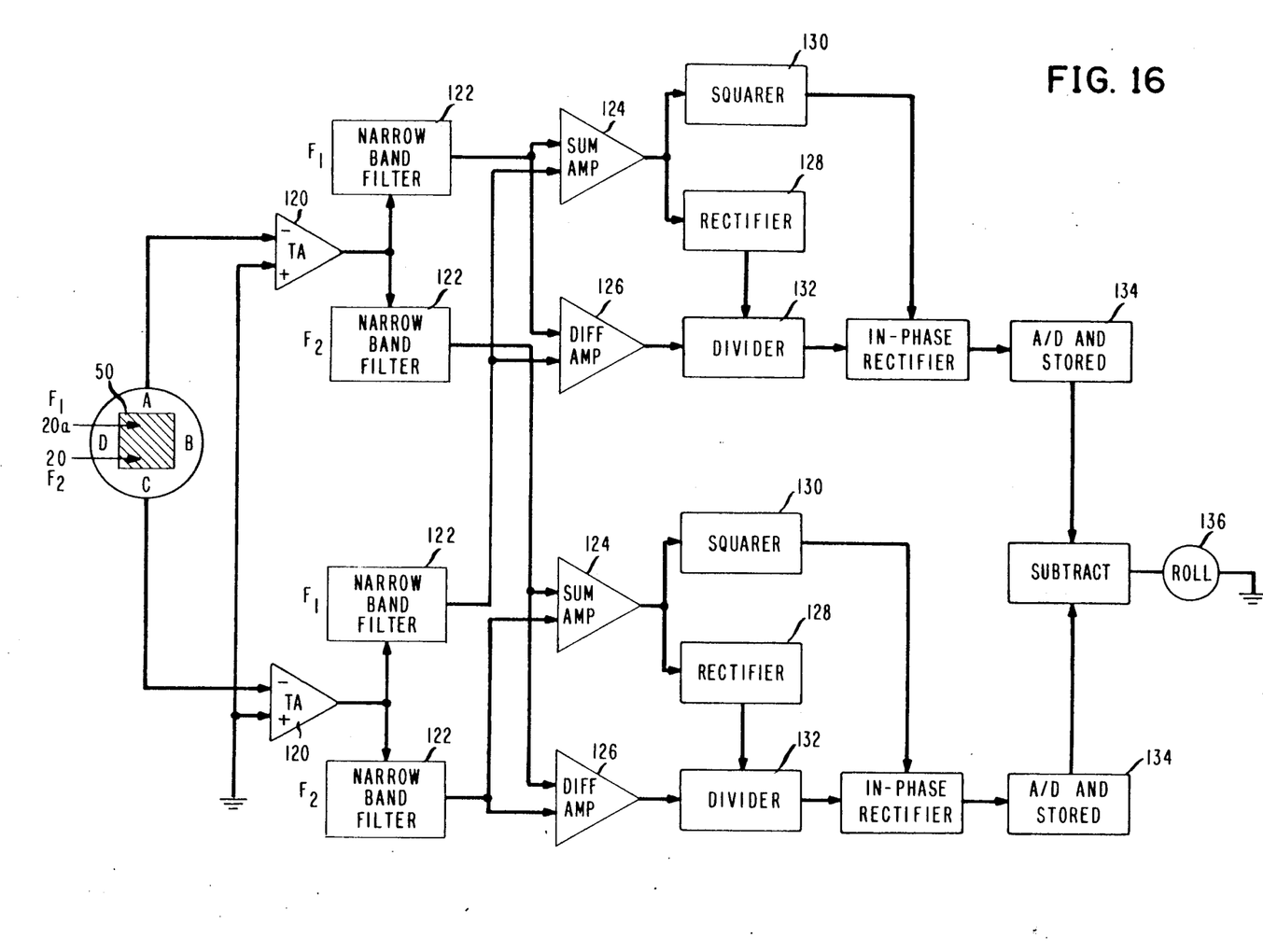
FIG. 16 shows a single cell roll detector receiving dual frequency modulated laser light.
Figure 17:
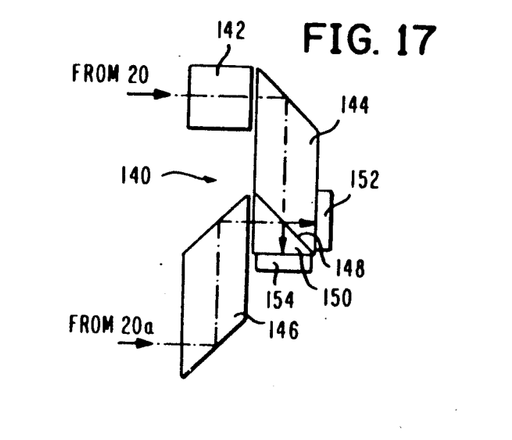
FIG. 17 shows the optical arrangement for a dual dual cell roll detector.

One modification to the arrangement of FIG. 5 eliminates the tilt plate for moving the light spots across the lateral effect cell and as shown in FIG. 16, employs differential measurement on a single cell. The images of the two sources on the lateral effect cell are adjusted to have some horizontal coordinates with the result that their variation in their vertical coordinates becomes proportional to roll angle. This overcomes the potential problems of non-linearity and null position temperature shift when a separate lateral effect cell is used for each light spot. An especial advantage of bringing both images simultaneously to a single lateral effect cell is that this signal processing technique can be brought to bear. It substantially eliminates roll errors introduced by rapidly fluctuating pitch or yaw movement such as might be caused by vibrations. This is not easily possible (short of long time averaging) when sequential measurements of image position are made.

In FIGS. 1 through 6 the two laser beams from fibers 20 and 20a are modulated out of phase, one being off while the other is on. FIG. 16 shows the arrangement for processing the output of lateral effect cell 50. The total output of cell 50 is fed to transimpedance amplifiers 120 from these to narrow band filters 122 and processed in the conventional manner by sum and difference amplifiers 124 and 126 respectively and by rectifiers 128, squarers 130 and dividers 132 to yield two out of phase, normalized signals. Each of the two signals is converted to digital form, stored and added at 134 to produce a signal whose amplitude is a measure of roll error magnitude and whose phase with respect to a reference signal indicates the sign of the roll error. This result is display on a roll indicator 136.

Figure 18:
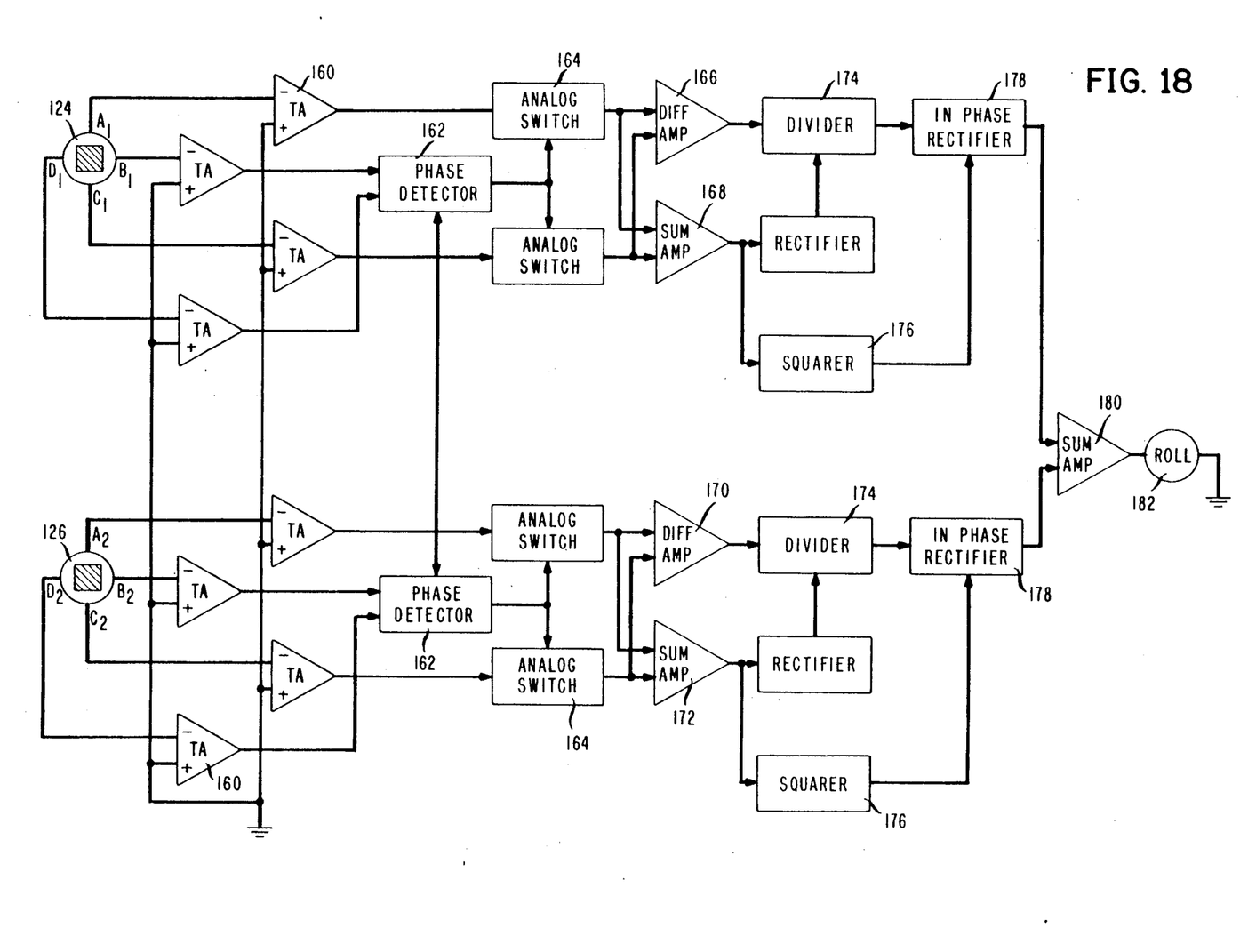
FIG. 18 shows the electronic block diagram for the dual cell roll detector of FIG. 17.

In the modification of FIG. 17 and 18, the output currents of the lateral effect cells 124 and 126 of FIG. 17 are the result of the laser beams being modulated at the same frequency but out of phase. Here the up/down signals (A-C) are used for roll measurement while the right/left signals (B-D) are used for phase detection after being converted to voltages by the transimpedance amplifiers 160 phase detectors control analog switches 164 allowing only one of the two out of phase signals to pass. On this basis upper and differential and sum amplifiers 166 and 168 respectively will receive the reference signals and the lower differential and sum amplifiers 170 and 172 respectively will receive the out of phase signals only.

The difference signal is divided by the rectified sum signal in both channels. Each divider 174 produces an output signal proportional to the displacement and the laser beam power and modulation variations are nullified. The output signal in each channel is inphase rectified at 178 using the corresponding squared sum signal at 176. Summing the rectified output signals from both channels at 180 yields the roll measurement at display 182.

Figures 19, 20:
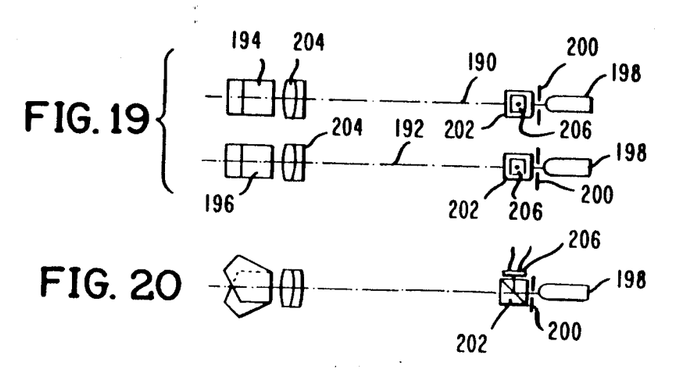
FIG. 19 shows schematically, in plan view the optical arrangement of the roll reference integrity module.
FIG. 20 is the elevational view of FIG. 19.

FIGS. 19 and 20 show in detail the optical arrangement of module 53 which comprises a pair of small side-by-side autocollimators 190 and 192, the former viewing mirror 51 of FIG. 5 via pentaprism 194, and the latter viewing the mirror of reference surface 52 via pentaprism 196. Each autocollimator is provided with an infrared light emitting diode 198 the light from which passes through a pinhole 200, through beamsplitting prism 202 and to a collimating lens 204, from which it enters the associated pentaprism. After reflection from the target mirror, the returning light is reflected by the beamsplitting prism upward to a lateral effect chip 206 cemented to the top of the beamsplitting prism. The outputs of the lateral effect chips are processed by conventional electronics to indicate any lack of parallelism between mirror 51 and roll reference mirror 52 and to provide the basis for correction.

We claim:

1. A boresighting system for simultaneously measuring pitch, yaw and roll on a vehicle, comprising a transmitter for projecting through an objective lens the collimated light from a pair of spaced-apart angularly divergent light beams from a pair of single mode optical fibers, a beam splitting mirrored pitch and yaw reference surface whose normal precisely defines the axis midway between said light beams, a receiver for receiving said collimated light beams, said receiver consisting of a first section for measuring pitch and yaw, and a second section, including a roll measuring module of the position-sensitive light cell type for measuring roll, said reference surface mirror separating the two sections, said first section consisting of a pitch and yaw measuring position-sensitive light cell and an objective lens for receiving by reflection rom said reference surface, and focusing as images, the incoming collimated light from the transmitter onto said pitch and yaw measuring position-sensitive light cell, said second section receiving light passing through said mirrored pitch and yaw reference surface and imaging said light on the roll measurement module.

2. The boresighting system of claim 1 wherein said second section is provided with a roll reference surface attached to said vehicle for controlling the position of the light on the measuring module.

3. The boresighting system of claim 1 wherein the optical fibers are laser illuminated and terminate at said objective lens.

4. The boresighting system of claim 3 wherein said termination is at the nodal point of said objective lens.

5. The boresighting system of claim 1 wherein the roll measurement module consists of a single position-sensitive light cell.

6. The boresighting systems of claim 1 wherein the roll measurement module consists of a pair of position sensitive light cells.

7. The boresighting system of claim 1 wherein the objective lens of said transmitter comprise a collimator of the retroreflective catadioptric type.

8. The boresighting system of claim 1 wherein the pitch and yaw reference surface is positioned one half the focal length of the objective lens from said pitch and yaw measuring cell and with its surface normal to the axis of said objective lens.

9. The boresighting system of claim 1 wherein the objective lens of the receiver is of the retroreflective catadioptric collimator type used in reverse.

10. The boresighting system of claim 1 wherein the pitch and yaw measuring position sensitive cell is located at the nodal point of said objective lens.

11. The boresighting system of claim 1 including a telenegative lens between said beam splitting reference surface and said roll measuring module.

12. A boresighting system of claim 11 wherein said telenegative lens is translatable along both the X-axis and the Y-axis.

13. The boresighting system of claim 1 including a movable tilt plate between the beam splitting reference surface and the roll measurement module for scanning the image light across the roll measurement module.

14. A boresighting system for a vehicle having a first station provided with a fixed reference line and a second station comprising a unit to be boresighted relative to said reference line, a transmitter positioned at one of said stations, a retroreflective catadioptric objective lens, said transmitter projecting a pair of divergent spaced-apart collimated light beams through said objective lens, a receiver positioned at the other of said stations for receiving the collimated light through a second retroreflective objective lens and focusing part of said collimated light via said second objective lens on a first light receiving module for measuring pitch and yaw, and a second light receiving module on which is focused the remainder of said light from said collimated light beams.

15. A boresighting method for alignment of the axis of a vehicle-borne aimable unit to fixed reference axes of pitch, yaw and roll mounted on said vehicle comprising the steps of: establishing on said vehicle through a first objective lens a pair of angularly divergent collimated light sources whose central rays, through their mean direction, are parallel to said axes of pitch and yaw, and through their plane define a direction parallel to said roll axis; establishing at the aimable unit a light receiver including a second objective lens and a first position-sensitive light cell module; establishing a semireflective pitch-yaw reference surface whose normal is parallel to the pitch-yaw reference line of the aimable unit; receiving at said pitch-yaw reference surface the light from the first objective lens; reflecting at said pitch-yaw reference surface a part of the light into said second objective lens and onto said first position-sensitive light module; and transmitting, through said pitch-yaw reference surface, the remainder of the light onto a second position-sensitive light cell module for measuring roll.

16. The boresighting system of claim 15 wherein said first light module consists of a position-sensitive light cell.

17. The boresighting system of claim 15 wherein said second light module consists of a single position-sensitive light cell.

18. The boresighting method of claim 15 wherein said first position-sensitive light cell module utilizes a lateral effect cell.

19. The boresighting method of claim 15 wherein said second position-sensitive light cell module utilizes a lateral effect cell.

20. The boresighting method of claim 15 wherein said second position-sensitive light cell module utilizes a pair of spaced-apart lateral effect cells.

21. A boresight system for a vehicle having a first station provided with a fixed reference line and a second station comprising a unit to be boresighted relative to said reference line, a transmitter positioned at one of said stations, said transmitter projecting a pair of angularly divergent collimated light beams, a receiver positioned at the other of said stations for receiving the collimated light and focusing part of said collimated light on a first light receiving module for measuring pitch and yaw, and a second light receiving module on which is focused the remainder of said light from said collimated light beams wherein said first light module is a position-sensitive effect cell.

22. A boresighting system for a vehicle having a first station provided with a fixed reference line and a second station comprising a unit to be boresighted relative to said reference line, a transmitter positioned at one of said stations, said transmitter projecting a pair of angularly divergent collimated light beams, a receiver positioned at the other of said stations for receiving the collimated light and focusing part of said collimated light on a first light receiving module for measuring pitch and yaw, and a second light receiving module on which is focused the remainder of said light from said collimated light beams wherein said second light module consists of a pair of position-sensitive light cells.

23. A boresighting system for a vehicle having a first station provided with a fixed reference line and a second station comprising a unit to be boresighted relative to said reference line, a transmitter positioned at one of said stations, said transmitter projecting a pair of angularly divergent collimated light beams, a receiver positioned at the other of said stations for receiving the collimated light and focusing part of said collimated light on a first light receiving module for measuring pitch and yaw, and a second light receiving module on which is focused the remainder of said light from said collimated light beams wherein said second light module consists of a pair of position sensitive lateral effect cells.

* * * * *